United States Patent [19]

Eckart Best Available Copy

[11] E Re. 30,304

[45] Reissued Jun. 10, 1980

[54] GROUND FAULT PROTECTION SYSTEM

[75] Inventor: Gregory C. Eckart, Southington, Conn.

[73] Assignee: General Electric Company, New York, N.Y.

[21] Appl. No.: 924,255

[22] Filed: Jul. 13, 1978

Related U.S. Patent Documents

Reissue of:

[64] Patent No.: 4,044,395
Issued: Aug. 23, 1977
Appl. No.: 710,391
Filed: Aug. 2, 1976

[51] Int. Cl.[2] ..... H02H 3/28

[52] U.S. Cl. ..... 361/44; 361/48

[58] Field of Search ..... 361/44–46, 361/42, 47–50, 87, 88; 340/656, 664, 649, 650; 324/51

[56] References Cited

U.S. PATENT DOCUMENTS

| | | | |
|---|---|---|---|
| 3,427,505 | 2/1969 | Biedermann | 361/44 |
| 3,539,866 | 11/1970 | Stevenson | 361/44 |
| 3,555,359 | 1/1971 | Morris et al. | 361/45 |
| 3,654,515 | 4/1972 | Kato et al. | 361/45 |
| 3,813,579 | 5/1974 | Doyle et al. | 361/46 |
| 3,857,096 | 12/1974 | Gregory | 324/128 |
| 3,872,355 | 3/1975 | Klein et al. | 361/45 |
| 3,898,528 | 8/1975 | Runtsch et al. | 361/45 |

*Primary Examiner*—Patrick R. Salce
*Attorney, Agent, or Firm*—Robert A. Cahill; Walter C. Bernkopf; Philip L. Schlamp

[57] ABSTRACT

A conventional residential ground fault circuit interrupting (GFCI) device is utilized to control a traditional circuit interrupter in protecting a large power distribution circuit against ground faults. The GFCI device is connected in an energization circuit for a solenoid operable to open the interrupter contacts. A sensor responds to ground faults on the distribution circuit by impressing the current signal on one side of the energization circuit, thus creating a current imbalance effective to trip the GFCI device. Interruption of the energization circuit causes the solenoid to initiate opening of the interrupter contacts. In an alternative embodiment, the GFCI device is adapted to initiate opening of the interrupter contacts upon degradation of ground circuit continuity.

10 Claims, 2 Drawing Figures

GROUND FAULT PROTECTION SYSTEM

Matter enclosed in heavy brackets [ ] appears in the original patent but forms no part of this reissue specification; matter printed in italics indicates the additions made by reissue.

BACKGROUND OF THE INVENTION

Ground fault protection for personnel and electrical equipment is an ever increasing concern in both home and industry. For residential circuit applications, ground fault circuit interrupting (GFCI) devices are now widely available in compact circuit breaker and receptacle configurations for convenient installation in existing service entry equipment and well receptacle boxes. These GFCI devices are primarily intended to protect people from the hazards of electrical shock caused by leakage current emanating from ground faults, however they do afford a measure of equipment protection in terms of acting to halt ground fault currents which can be damaging to insulation.

For higher current applications found in industry, ground fault protection is available in basically two configurations. With the advent of so-called "static trip" circuit breakers, it has become economically possible to combine overcurrent and ground fault signal processing circuitry in a compact electronic trip unit package which can be integrated with the circuit breaker to achieve comprehensive circuit protection. Alternatively, traditional circuit breakers thermal-magnetic and dual-magnetic trip units for overcurrent protection can be utilized with so-called "ground fault relays" in providing ground fault protection as well. These relays respond to a ground fault signal developed by a suitable sensor, such as a zero sequence transformer coupled with the load carrying conductors, by energizing (or de-energizing) a solenoid which, in turn trips breaker to initiate circuit interruption.

One industrial application where ground fault protection is particularly important is in the mining industry where local grounding of necessary portable electrical machinery in not practical. Thus, for personnel safety, a low impedance ground at the machinery site must be maintained through a wire grounded at the source and running to the machinery with so-called trailing cable utilized in conveying electrical power to the machinery. It will be appreciated that a discontinuity in this grounding conductor or a degradation of its requisite low impedance character would permit the voltage on the machinery frame, should a breakdown in insulation exist between it and one of the line conductors, to rise above ground potential. With the high voltage and current levels typically utilized in the mining industry, the potential for a lethal shock to machinery operators or explosion due to arcing is high even though the ground fault is cleared promptly upon recognition of the flow of ground leakage current.

It is accordingly an object of the present invention to provide an inexpensive ground fault protection system suitable for high current, industrial circuit applications.

An additional object of the present invention is to provide a ground fault protection system of the above character which utilizes as its fault clearing component a circuit interrupting device of the more traditional, non-static trip design.

A further object of the present invention is to provide a ground fault protection system of the above character which utilizes as one of its principle components a low-cost ground fault circuit interrupting (GFCI) device of the type presently enjoying wide use in low-power residential circuitry.

Yet another object is to provide a ground fault protection system of the above character which is capable of monitoring the continuity of a ground circuit path and operating automatically to interrupt a power distribution circuit should the impedance of the ground fault circuit path exceed a preselected value.

Other objects of the invention will in part be obvious and in part appear hereinafter.

SUMMARY OF THE INVENTION

In accordance with the present invention, there is provided a ground fault protection system ideally suited for application to high current, power distribution circuits, wherein the system utilizes as its principle operating component a conventional ground fault circuit interrupting (GFCI) device of the type mass-produced for use in light dry residential circuits. As is well known, such conventional GFCI devices utilize a differential current transformer to sense imbalances in the currents going out to and returning from a load, as would be occasioned by leakage current returning to the source through an unintended ground path. The differential current transformer develops an analog signal proportional to this leakage current which is processed by electronic circuitry, and, if of a predetermined magnitude and duration, an electronic switch is triggered to complete an energization circuit for a shunt trip solenoid. Upon energization, the solenoid plunger strikes a latch to release a spring powered mechanism which is freed to open contacts, clearing the ground fault through which the leakage current originates.

In accordance with the present invention, the GFCI device is installed in a control circuit for an actuator operative to open contacts of a circuit interrupting device connected in the power distribution circuit. As long as the control circuit retains continuity, the circuit interrupting device contacts remain closed and power is delivered to the load or loads supplied by the distribution circuit. When the GFCI device trips the control circuit is interrupted, and the actuator responds by initiating opening of the contacts of the circuit interrupting device, interrupting the distribution circuit. The actuator may take the form of a conventional undervoltage release solenoid adapted to a circuit breaker of traditional design or of a holding coil of a conventional contactor utilized in electrical motor controllers.

In one form of the invention, a ground fault sensor is coupled with the line conductors of the distribution circuit for developing a current signal in the event a ground fault appears on the distribution circuit. This current signal is impressed across one side of the control circuit energizing the actuator to create a current imbalance sensible by the differential current transformer of the GFCI device. The GFCI device trips to interrupt the control circuit, and the actuator operates to open the interrupting device contacts, clearing the ground fault on the distribution circuit.

For mining applications, the GFCI device is utilized in accordance with the present invention to monitor the continuity of the ground circuit path for portable mining machinery. To this end, the energization circuit for the actuator is expanded to include the series combination of a ground wire and a pilot wire of a conventional trailing cable running from the power source out to the portable machinery. A suitably valued impedance element is connected to divert sufficient current around the differential current transformer to produce a current imbalance effective to trip the GFCI device should the impedance of that portion of the energization circuit including the ground and pilot wires exceed a preselected value. As a consequence, the deliverance of power to the machinery is contigent upon the integrity of the ground circuit path to the machinery, and thus proper grounding of the machinery is assured should a ground fault occur.

The invention accordingly comprises the features of constructions and arrangement of parts which will be exemplified in the constructions hereinafter set forth, and the scope of the invention will be indicated in the claims.

For a better understanding of the nature and objects of the invention, reference should be had to the following detailed description taken in conjunction with the accompanying drawing, in which:

FIG. 1 is a circuit diagram, partially in block form, of a ground fault protection system constructed according to one embodiment of the present invention; and FIG. 2 is a circuit diagram, partially in block form, of the ground fault protection system in FIG. 1 expanded to include the capability of monitoring the impedance of a ground circuit path for the load.

Corresponding reference numerals refer to like parts throughout the several views of the drawing.

DETAILED DESCRIPTION

Figure 1:
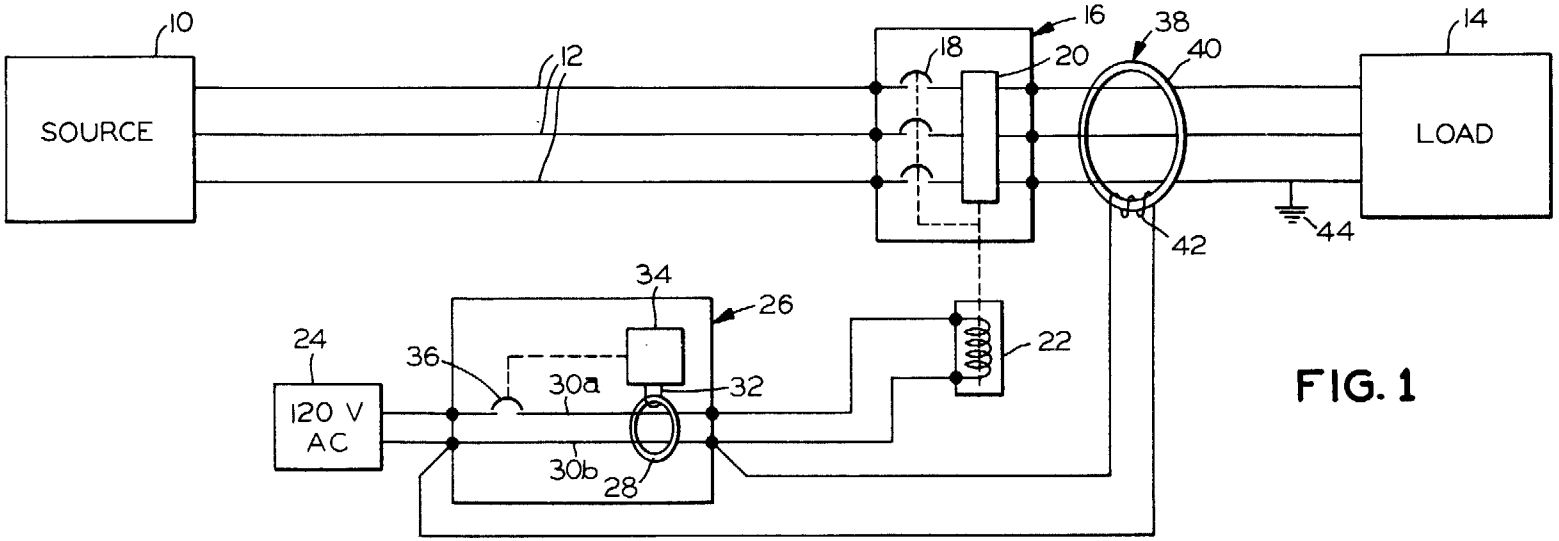

Turning to FIG. 1 of the drawing, the ground fault protection system of the present invention is depicted in its application to an electrical distribution circuit including a source 10 supplying three-phase power over phase or line conductors 12 to a load 14. Included in this distribution circuit is a conventional three-pole circuit breaker, generally indicated at 16, having separable contacts 18 connected in series with each line conductor 12. The circuit breaker also includes, as diagrammatically illustrated in FIG. 1, a trip unit 20 of known construction responsive to the levels of current flowing in the three line conductors for effecting automatic opening of the breaker contacts 18 under overload and short circuit conditions.

Operatively associated with circuit breakers 16 in a well known manner is an undervoltage release solenoid 22. As is well understood in the art, an undervoltage release solenoid in its adaptation to a circuit breaker is designed to magnetically attract its plunger to an inactive position against the bias of a spring, so long as its coil is sufficiently energized. With the plunger in this attracted, inactive position, the circuit breaker contacts 18 may be manually closed and can remain closed. Should the level of energization of the solenoid coil fall below a predetermined level, caused by an undervoltage conditions, the return spring takes control, pulling the plunger out to a retracted position where it trippingly engages a circuit breaker latch to automatically open the breaker contacts.

In accordance with the ground fault protection system of the present invention, the undervoltage release solenoid 22 is not utilized to monitor the voltage levels on the distribution circuit, but rather is energized from a separate source 24. For reasons which will become apparent, source 24 is preferably a 120 volt AC source, and undervoltage release solenoid 22 is designed such that it receives sufficient energization from this source to hold its plunger in the attracted, inactive position, allowing the breaker contacts to close and remain closed. While source 24 is shown to be separate from source 10, typically a higher voltage source, it will be appreciated that the nominal 120 volts AC necessary to energize solenoid 22 may be derived from the higher voltage source 10 via a suitable transformer. In this situation, it is seen that solenoid 22 can provide a measure of undervoltage protection for the distribution circuit.

Connected in the energization circuit for undervoltage release solenoid 22 is a ground fault circuit interrupting (GFCI) device, generally indicated at 26, of the type widely used in low voltage (e.g., 120 volts AC) residential circuits for protecting humans from the hazards of electrical shock due to ground faults. As diagrammatically illustrated in FIG. 1, the GFCI device 26 includes a differential current transformer consisting of a toroidal core 28, a first single turn primary winding 30a connected in series with one side of the solenoid energization circuit, a second single turn primary winding 30b connected in series with the other side solenoid energization circuit, and a multi-turn secondary winding 32 connected to the input of an electronic module 34. As is well understood in the art, the differential transformer develops a signal in its secondary winding 32 in response to a differential in the currents flowing in the primary windings 30a and 30b, as would be occasioned by an imbalance in the currents flowing in the two sides of the solenoid energization circuit. This signal is processed by electronic module 34, and, if found to exceed a predetermined magnitude and duration, an electronic switch is triggered to complete an energization circuit for a shunt trip solenoid (not shown). Energization of this solenoid initiates the opening of contacts 36 to interrupt the energization of circuit for solenoid 22.

To sense a ground fault on the distribution circuit to the load side of circuit breaker 16, a ground fault sensor, generally indicated at 38 and typically a zero sequence transformer, is utilized. Thus, as illustrated in FIG. 1, sensor 38 comprises a toroidal core 40 which embraces the three line conductors 12 of the distribution circuit. As long as the vectorial sum of the currents flowing in the three line conductors 12 equals zero, the net flux induced in core 40 is also zero and no voltage is induced on its multi-turn secondary winding 42, which is connected across primary winding 30b of GFCI device 26. It is seen that in the absence of an induced voltage in sensor secondary winding 42, the GFCI differential current transformer remains balanced, and undervoltage release solenoid 22 remains energized. On the other hand, if a ground fault should exist on the distribution circuit, such as illustrated at 44, the vectorial sum of the currents in line conductors 12 no longer equals zero, and a voltage is induced in secondary winding 42. This induced voltage, as impressed across primary winding 30b, causes additional current to flow therethrough, and the GFCI differential transformer becomes unbalanced, resulting in interruption of the solenoid energization circuit. As the undervoltage release solenoid 22 drops out, circuit breaker 16 is tripped to interrupt the distribution circuit, clearing ground fault 44.

From the foregoing description of the embodiment of applicant's invention illustrated in FIG. 1, it is seen that by using three low-cost, widely available components, namely, a residential GFCI device, an undervoltage release solenoid and a ground fault sensor, in the unique combination taught by applicant to control a conventional industrial circuit breaker, economical ground fault protection is afforded to a high current, power distribution circuit.

Figure 2:
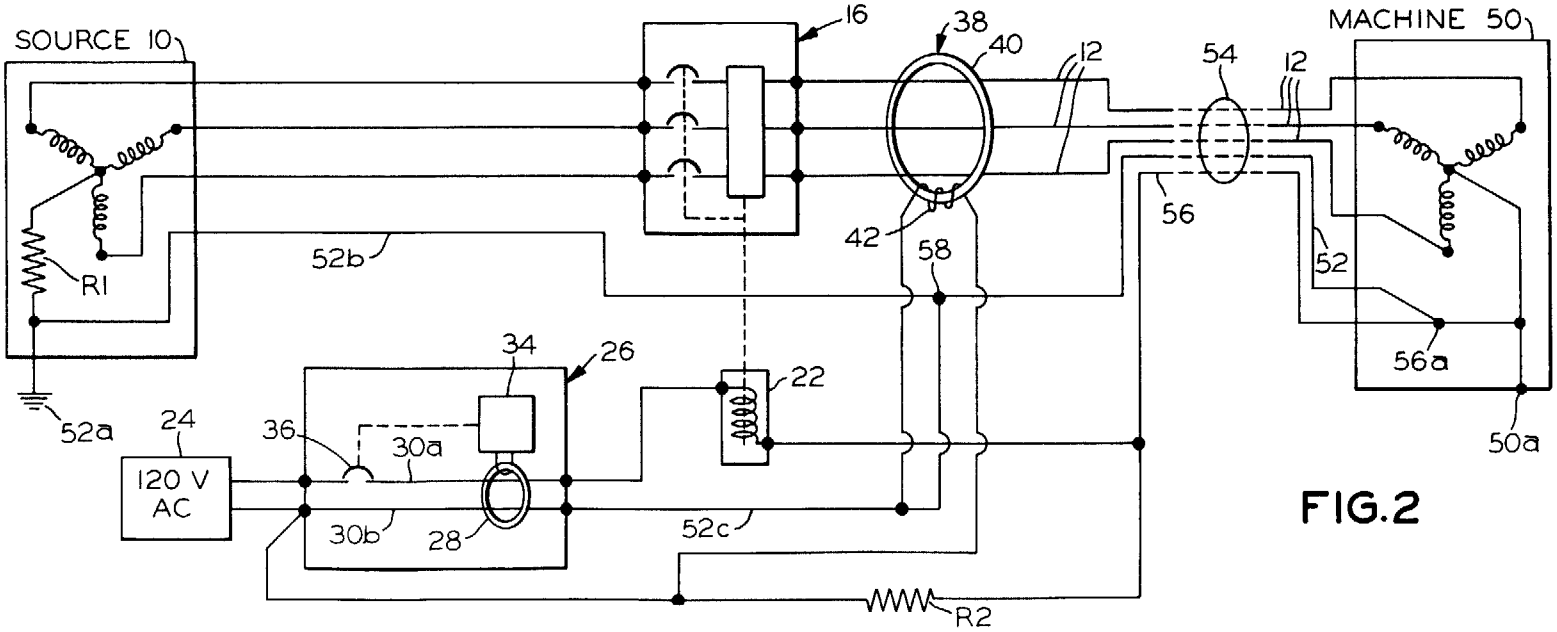

The embodiment of applicant's invention seen in FIG. 2 is specifically adapted to meet certain MESA requirements for power distribution in mining applications. The peculiar problem raised in mining applications is that the load is typically a portable machine which cannot be readily grounded for personnel safety at its site of operation. As a consequence, grounding of the portable machine, indicated at 50 in FIG. 2, is achieved by a ground wire 52, connected to the machine frame at 50a and running back to source 14 with line conductors 12 via a so-called trailing cable 54 where the ground wire can be solidly grounded, as indicated at 52a. Source 14 is illustrated as a wye-connected source with its neutral connected to ground through a ground fault current limiting resistor R1, as is conventional practice. As in the system of FIG. 1, a three-pole industrial circuit breaker 16 is connected in the distribution circuit between the source and load. Operatively associated with this breaker is an undervoltage release solenoid 22 which is energized from an underground 120 volt AC source via a GFCI device 26. Also in the manner described in FIG. 1, a ground fault sensor 38 includes a core 40 embracing line conductors 12 and a secondary winding 42 connected to impress an induced voltage across primary winding 30b of the GFCI differential current transformer. Thus, the system of FIG. 2 also operates to interrupt the distribution circuit in response to ground leakage current flowing through a ground fault on the distribution circuit. The system of FIG. 2 is, however, expanded to also respond to a degradation in the continuity of ground wire 52. It will be appreciated that any such degradation in the ground conductor continuity running from the machine back to source 14 where it is solidly grounded at 52a would permit the machine frame to take on a voltage above ground should it become faulted with one of the line conductors 12. This represents an extremely hazardous situation for the machine operator since, at the high voltage and current levels involved, the system could not operate fast enough to prevent injurious consequences should the operator be subjected to ground fault current. Moreover, the ground fault protection system cannot be set to respond to the low levels of leakage current which are lethal to humans, as nuisance tripping would be a severe problem, particularly in mining applications.

Thus, in accordance with the embodiment of applicant's invention seen in FIG. 2, the energization circuit for undervoltage release solenoid 22 is expanded to include the series combination of ground wire 52 and a continuity check or pilot wire 56 now required in mine duty trailing cable. The source end of pilot wire 56 is connected to the right terminal of undervoltage release solenoid 22, while its load end is connected in common with ground wire 52 at 56a. At the source end, ground wire 52 splits at junction 58, with one wire 52b returning to the ground 52a at souce 14 and the other wire 52c directed to one side of the 120 volt AC source via GFCI primary windng 30b. A resistor R2 is connected between the source end of pilot wire 56 and the line side terminal of GFCI primary winding 30b. It is thus seen that this resistor shunts that portion of the solenoid energization circuit including pilot wire 56, ground wire 52 and GFCI primary winding 30b.

From the foregoing description, it will be appreciated that as long as the ground and pilot wires in the trailing cable retain their requisite load resistance character, most of the current from the 120 volt AC source energizing the undervoltage release solenoid will return via the pilot wire 56, ground wire 52, conductor 52c and the GFCI primary winding 30b. Thus, the GFCI differential current transformer remain essentially balanced, an its contacts remain closed to continue solenoid energization. However, should the continuity of the ground and pilot wires running out to machine 50 become degraded, more and more of the solenoid energization current will be diverted around GFCI primary winding 30b via resistor R2. The value of this resistor is selected such that when the resistance of that portion of the energization circuit including the ground and pilot wires exceeds a predetermined value, for example, 4 ohms, sufficient current is bypassed around GFCI primary winding 30b to create the requisite current imbalance to trip the GFCI device 26. The solenoid energization circuit is thus interrupted and circuit breaker 16 is tripped to, in turn, interrupt the distribution circuit.

While the system of FIG. 2 is equipped to interrupt the distribution circuit both upon the existence of a ground fault and upon degradation of the continuity of the pilot and ground wires of the trailing cable, it will be appreciated that the system may be adapted to merely monitor the continuity of the ground and pilot wires and to effect distribution circuit interruption upon continuity degradating in which case ground fault sensor 38 is eliminated.

While the foregoing description refers to the distribution circuit interrupting device as being an industrial circuit breaker, it will be appreciated that the desired ground fault protection could still be achieved using a conventional contactor, rather than a circuit breaker. The function of the undervoltage release solenoid in opening the distribution circuit interruptor contacts will then be served by the contactor holding coils. Thus, the term circuit breaker appearing in the detailed description and claims is used generically to apply to all forms of circuit interrupting devices whose circuit interrupting contacts can be operated to open circuit positions by a suitable actuator. Moreover, while the disclosed embodiments of applicant's invention rely upon de-energization of a solenoid-type device to effect interruption of the distribution circuit, it will be appreciated that the energization circuit can be modified such that tripping of the GFCI device 26 results in energization of an actuator, such as a shunt trip solenoid, to precipitate opening of the distribution circuit interrupting device contacts.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desired to secure by Letters Patent is:

1. A protection system for an electrical power distribution circuit, said system comprising, in combination:

A. a circuit breaker having contacts connected in the distribution circuit;

B. an actuator operable to open said breaker contacts and interrupt current flow in the distribution circuit;

C. a control circuit for said actuator;

D. a GFCI device including 1. contacts connected in said control circuit,
2. a differential current transformer having a primary winding connected in series with each of the two sides of said control circuit and a secondary winding in which is developed an output signal indicative of an imbalance in the currents flowing in said primary windings,
3. means responsive to said output signal for opening said device contacts to interrupt said control circuit; and E. a ground fault sensor coupled with the distribution circuit and having an output connected across one of said primary windings, said sensor developing in response to a ground fault on the distribution circuit a current signal in said one primary winding effective to create a current imbalance in said differential current transformer, whereby said device contacts open to interrupt said control circuit and said actuator operates to effect opening of said breaker contacts.

2. The system defined in claim 1, wherein said sensor is a zero sequence transformer having a toroidal core encircling the load current carrying conductors of the distribution circuit and an output winding connected across said one primary winding.

3. The system defined in claim 2, wherein said actuator is an undervoltage release solenoid.

4. A protection system for an electrical power distribution circuit having plural phase conductors, a ground wire and a pilot wire, wherein the ground wire is connected to ground at the power source and is connected in common with the pilot wire at the load, said system comprising, in combination:

A. a circuit breaker having contacts connected in the distribution circuit;

B. an actuator operable to open said breaker contacts and interrupt current flow in the phase conductors of the distribution circuit;

C. a control circuit including said actuator, a portion of the ground wire, and the pilot wire connected in series across an energization source;

D. a GFCI device including 1. contacts connected in said control circuit,
2. a differential current transformer having a first primary winding connected in series between said energization source and one terminal of said solenoid, a second primary winding connected in series between said energization source and the other terminal of said solenoid through the ground and pilot wires, and a secondary winding in which is developed an output signal indicative of an imbalance in the currents flowing in said first and second primary windings, and
3. means responsive to said output signal for opening said device contacts to interrupt said control circuit; and E. an impedance element connected between said other terminal of said solenoid and the junction between said second primary winding and said energization source, said impedance element having an impedance selected such as to divert current around said second primary winding to sufficiently unbalance said differential current transformer to effect interruption of said control circuit and thence operation of said actuator to open said breaker contacts when the impedance of that portion of said control circuit including the ground and pilot wires exceeds a predetermined value.

5. The system defined in claim 4, which further includes a ground fault sensor coupled with the phase conductors of the distribution circuit and having an output connected across one of said first and second primary windings, said sensor developing in response to a ground fault on the distribution circuit a current signal in said one primary winding effective to unbalance said differential current transformer, whereby to effect interruption of said control circuit and thence operation of said actuator to open said breaker contacts.

6. The system defined in claim 4, wherein said actuator is an undervoltage release solenoid.

7. The system defined in claim 5, wherein said sensor is a zero sequence transformer having a toroidal core encircling the load current carrying conductors of the distribution circuit and an output winding connected across said one primary winding.

8. A protection system for an electrical power distribution circuit, said system comprising, in combination:

A. a circuit breaker having contacts connected in the distribution circuit;

B. an actuator operable to open said breaker contacts and interrupt current flow in the distribution circuit;

C. a control circuit for said actuator;

D. a GFCI device including 1. contacts connected in said control circuit;
2. a differential current transformer having a primary winding connected in series with each of the two sides of said control circuit and a secondary winding in which is developed an output signal indicative of an imbalance in the currents flowing in said primary windings,
3. means responsive to said output signal for opening said device contacts to interrupt said control circuit; and E. sensing means coupled with the distribution circuit and said GFCI device for creating in response to a predetermined abnormal distribution circuit condition a current imbalance in said primary windings of said differential current transformer sufficient to cause opening of said GFCI device contacts and thus interruption of said control circuit, said actuator thereupon operating to open said breaker contacts.

*9. A protection system for an electrical power distribution circuit, said system comprising, in combination:*

*A. a circuit breaker having contacts connected in the distribution circuit;*

*B. an actuator operable to open said breaker contacts and interrupt current flow in the distribution circuit;*

*C. a control circuit for said actuator;*

*D. a GFCI device including*

*(1) contacts connected in said control circuit,*

*(2) a differential current transformer having a pair of primary windings and a secondary winding in which is developed an output signal indicative of an imbalance in the currents flowing in said primary windings,*

*(3) means responsive to said output signal for actuating said device contacts; and*

*E. a ground fault sensor coupled with the distribution circuit and having an output connected across one of*

*said primary windings, said sensor developing in response to a ground fault on the distribution circuit a current signal in said one primary winding effective to create a current imbalance in said differential current transformer, whereby said device contacts act to initiate operation of said actuator in effecting opening of said breaker contacts.*

*10. A protection system for an electrical power distribution circuit, said system comprising, in combination:*

*A. a circuit breaker having contacts connected in the distribution circuit;*

*B. an actuator operable to open said breaker contacts and interrupt current flow in the distribution circuit;*

*C. a control circuit for said actuator;*

*D. a GFCI device including*

*(1) contacts connected in said control circuit,*

*(2) a differential current transformer having a pair of primary windings and a secondary winding in which is developed an output signal indicative of an imbalance in the currents flowing in said primary windings,*

*(3) means responsive to said output signal for actuating said device contacts; and*

*E. sensing means coupled with the distribution circuit and said GFCI device for creating in response to a predetermined abnormal distribution circuit condition a current imbalance in said primary windings of said differential current transformer sufficient to cause actuation of said GFCI device contacts, said actuator thereupon operating to open said breaker contacts.*

* * * * *